Oct. 31, 1972   W. B. DAVIS   3,701,633
DISPOSABLE COLORIMETRIC PH INDICATOR AND SAMPLING
DEVICE FOR SWIMMING POOL WATER AND THE LIKE
Filed Feb. 10, 1971

INVENTOR
WARD BENJAMIN DAVIS
BY
ATTORNEY

United States Patent Office 3,701,633
Patented Oct. 31, 1972

3,701,633
DISPOSABLE COLORIMETRIC pH INDICATOR AND SAMPLING DEVICE FOR SWIMMING POOL WATER AND THE LIKE
Ward B. Davis, Glendale, Calif., assignor to Sterilizer Control Royalties, North Hollywood, Calif.
Continuation-in-part of application Ser. No. 800,887, Feb. 20, 1969, now Patent No. 3,620,676. This application Feb. 10, 1971, Ser. No. 114,188
Int. Cl. G01n 31/22, 33/18
U.S. Cl. 23—253 TP                  6 Claims

ABSTRACT OF THE DISCLOSURE

A disposable pH colorimetric indicator and sampling device particularly for swimming pool water is formed by embossing a synthetic plastic sheet with a syringe-like cavity and closing the cavity by adhering a plane synthetic plastic sheet over the cavity, the two sheets being either heat-sealed or adhesively joined together on the margins around the cavity, the cavity having a tubular portion one end of which opens at the edge of the adhered sheets, and the other end of the cavity being enlarged to form a finger-compressible enlargement. An interior coating of a pH colorimetric indicator composition reactive with the water to be tested is provided, the liquid being drawn into the tubular cavity by first compressing the enlargement, and releasing the pressure to draw in a water sample to dissolve and react with the indicator coating. The preferred indicator composition comprises a sodium salt of phenol red, an antichlor reagent and a binder.

REFERENCE TO RELATED APPLICATIONS

This is a continuation-in-part of my pending application Ser. No. 800,887, filed Feb. 20, 1969, now U.S. Patent No. 3,620,676.

BACKGROUND OF THE INVENTION

This invention relates to a simple portable disposable indicator and sampling device by which a sample of an aqueous liquid may be withdrawn from a larger quantity, and tested colorimetrically within the device for a selected constituent, for example, for the hydrogen ion concentration. The device contains the colorimetric reagent for indiacting the hydrogen ion concentration, but is also the reaction vessel and the suction means for filling it with a liquid sample. The device adjacent the cavity is transparent, at least on one side, so that the colors may be observed.

One object of the invention is to provide single-use inexpensive formed plastic indicator devices for measuring the pH (hydrogen ion concentration) of aqueous liquids. Another object is to provide means for withdrawing a sample of a liquid into a formed syringe-like device, which also contains a colorimetric pH reagent. A further object is to provide a syringe-like indicator device consisting of a plane plastic backing sheet adhered to an embossed plastic sheet, wherein the embossed figure forms a cavity with a closed compressible end portion and an inlet opening at one edge of the device. Another object is to provide an improved pH indicator composition.

These and other objects are attained by my invention, which will be understood from the following description, reference being made to the accompanying drawings.

DESCRIPTION OF PREFERRED EMBODIMENTS

Figure 1:
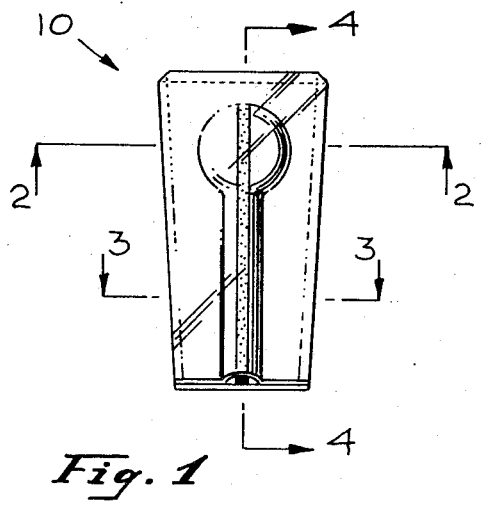
FIG. 1 is an enlarged plan view of a preferred form of the indicator device.
Figure 2:
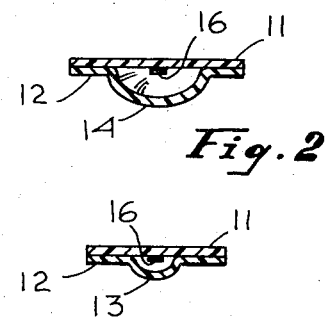
FIG. 2 is a cross-sectional view taken on the line 2—2 of FIG. 1.
Figure 3:
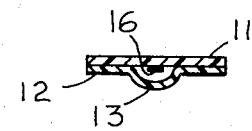
FIG. 3 is a cross-sectional view taken on the line 3—3 of FIG. 1.
Figure 4:
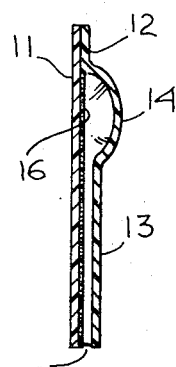
FIG. 4 is a cross-sectional view taken on the line 4—4 of FIG. 1.

Referring to the drawings, particularly FIGS. 1 to 4, the indicator device 10 consists of a plane backing sheet 11 of elongated shape such as a trapezoid or rectangle, and an embossed sheeted front member 12, both of synthetic plastic composition, for example, polyvinyl chloride. At least the front sheet is deformable. The front sheet is pre-formed in the center portion longitudinally with a half-tubular cavity 13 terminating at the lower edge, and a half-bulb cavity 14 connected to said tubular part near the upper edge of the front sheet. The front sheet 11 and the back sheet 12 are heat sealed, or alternatively adhesively joined together in the margins around the cavities so that a tubular portion terminating in a half- or part-bulb are formed, the tubular portion opening at the lower edge of the device at 15. Prior to the assembly of the parts, a stripe or mark 16 of a selected indicator composition is imprinted, for example by flexographic printing, on the backing sheet 11 at a position coinciding with the subsequent position of cavity molded or embossed in the front sheet. Other methods of printing such as silk screen, planographic or gravure may be used.

The indicator devices may be manufactured in multiples from large sheets, and subsequently be die cut into the final individual indicators. The back sheet before assembly is printed, flexographically, with properly spaced indicator spots or stripes. The front sheet is embossed or heat-formed with a plurality of connected tube and/or bulb impressions. The large sheets in pairs are then surface joined in aligned superimposition.

Figure 5:
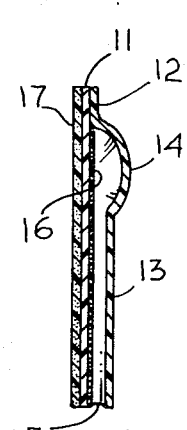
FIG. 5 is a cross-sectional view similar to FIG. 4 of an alternative form of my device.

As shown in FIG. 5, an opaque sheet 17 may be attached to the transparent backing sheet 11, or the backing sheet may be formed of a white plastic composition to provide a white comparison background for the indicator-produced color in the liquid within the device.

Figure 6:
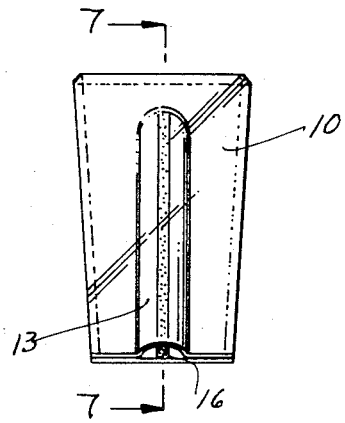
FIG. 6 is a plan view of a second alternative form of my device.
Figure 7:
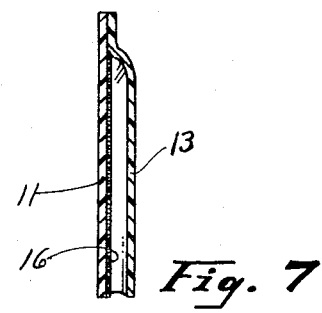
FIG. 7 is a cross-sectional view taken on the line 7—7 of FIG. 6.

In the alternative form shown in FIGS. 6 and 7, no enlargement or bulb is provided, and the upper portion of the tubular portion may be compressed and released in the same manner as in the preferred bulb-type above described.

The preferred material for making the indicator device is sheeted polyvinyl chloride plastic, but other sheeted plastic materials having similar properties may be used, for example polystyrene. The sheet thickness may be varied, but in the range of 6 to 10 mils is satisfactory. The tube opening may be about 1/32 to 1/6 inch by about 1/4 inch wide. The dimensions given are illustrative and are not critical.

Other forms of the device having an inlet opening into a compressible bulb-like portion may be used, the indicator compound being disposed in the bulb-like portion.

The pH color-change indicator composition which is disposed inside the formed device may be in the form of a powder, or it may be applied as a coating or spot by means of a flexographic type ink which is applied to the inside surface area, or part of it, either prior to assembly of the two sheets constituting the device, or afterwards. The composition, if applied wet, is dried in place.

For use particularly in testing the hydrogen ion concentration (pH) of water taken from swimming pools, or other treated water sources, it is necessary to provide in the composition, an "antichlor" reagent, that is, one which reacts with any free chlorine present, since free chlorine is usually present in the water of swimming pools, etc., and its presence upsets the specific colors of the indicator at different pH levels.

A preferred composition in dried form comprises a sodium salt of phenol red dye, an antichlor such as sodium thiosulfate, and a water soluble binder, preferably polyvinyl pyrrolidone. The sodium salt of cresol red may also be used, and the binder may alternatively be selected from a wide variety of water soluble gums.

The proportions are not closely critical and preferred proportions may be in the following range:

Sodium salt of phenol red dye—100 parts by weight
Sodium thiosulfate—from 7000 to 9000 parts by weight
Polyvinylpyrrolidone—from 1000 to 2000 parts by weight A preferred ink composition for use particularly for swimming pool water testing had the following composition, by weight:

| | Parts |
|---|---|
| Phenol red (water soluble) (Matheson Coleman & Bell, PX535 N.B. 187) | 4 |
| Sodium thiosulfate pentahydrate | 300 |
| Polyvinyl pyrrolidone (G.A.F. Corp. P.V.P. K–90) | 55 |
| Primary amyl alcohol | 610 |

This composition, when used at a concentration of about 10 mg. for a 10 ml. test sample of water, gives an orange yellow color at pH 6.8 or lower; a peach color at the most desirable range for swimming pools, 7.4 to 7.6; and a magenta color at a pH of 8 or more.

Water soluble Cresol red Matheson Coleman & Bell, CX2050) or the sodium salt of cresol red, may be substituted for the phenol red of the above preferred composition.

I claim:
1. A disposable colorimetric pH indicator and sampling device for swimming pool water, comprising a transparent synthetic plastic syringe-like body having a tubular cavity with one end open, the other end being closed by a finger-compressible enlargement, said body cavity containing a dry pH color-change composition.

2. The device defined in claim 1, in which said composition comprises a pH color change dye selected from the group consisting of water soluble phenol red, the sodium salt of phenol red, water soluble cresol red, and the sodium salt of cresol red.

3. The device defined in claim 2, in which the said composition contains a sufficient amount of an antichlor reagent to overcome the effect of free chlorine in the water on the colors produced by said dye composition.

4. A dry, water soluble pH color-change indicator composition comprising as essential ingredients a pH color change dye and an antichlor reagent.

5. The indicator composition defined in claim 4, and a water soluble binder.

6. The indicator composition defined in claim 4, in which the pH color change dye is selected from the group consisting of phenol red, the sodium salt of phenol red, cresol red, and the sodium salt of cresol red, and the antichlor reagent is sodium thiosulfate.

References Cited

UNITED STATES PATENTS 3,498,751   3/1970   Newhart et al. ---- 252—408 X

MORRIS O. WOLK, Primary Examiner

R. M. REESE, Assistant Examiner

U.S. Cl. X.R.

116—114; 128—2 R; 206—43, 56; 252—408